United States Patent [19]

May

[11] Patent Number: 4,511,806
[45] Date of Patent: Apr. 16, 1985

[54] PRESSURE DROP POWER GENERATION

[75] Inventor: Michael G. May, Bel Air, Switzerland

[73] Assignee: AIR Ltd., Arlington, Va.

[21] Appl. No.: 612,816

[22] Filed: May 22, 1984

[51] Int. Cl.³ .............................................. F03B 13/00
[52] U.S. Cl. ...................................... 290/43; 290/1 A; 290/54; 322/1; 322/35
[58] Field of Search ................. 290/1 R, 1 A, 43, 54, 290/52; 128/204.19, 204.20, 204.24; 322/1, 35, 100

[56] References Cited

U.S. PATENT DOCUMENTS

| | | | |
|---|---|---|---|
| 2,463,538 | 3/1949 | Horrell | 290/52 |
| 3,473,529 | 10/1969 | Wallace | 128/204.19 |
| 4,056,099 | 11/1977 | Metivier | 128/204.19 |
| 4,095,592 | 6/1978 | Delphia | 128/204.21 |
| 4,425,509 | 1/1984 | deJong | 290/1 R |

Primary Examiner—B. Dobeck
Assistant Examiner—Shelley Wade
Attorney, Agent, or Firm—Edwin E. Greigg

[57] ABSTRACT

What is proposed is an electrical energy generator that uses air pressure from a pressurized source for breathing purposes in an underwater or smoke environment wherein a conduit passes the air pressure to a turbine generator that operates at high speed in response to the flow rate of the pressure drop therethrough for generating an electrical output while the user of the device breathes through a mouthpiece connected via conduit to the generator.

6 Claims, 3 Drawing Figures

PRESSURE DROP POWER GENERATION

BACKGROUND OF THE INVENTION

This invention relates to the generation of electrical power via turbines and the like, and particularly to portable devices for such power generation under special and unusual conditions in which a person has need of electrical power for lighting and other energy-related activities.

In those environments in which a breathing apparatus is required, for example, an aqueous or smoke environment, the person so equipped usually has need of electrical power, particularly for lighting and light related activities. Under such circumstances, a power pack is usually carried by the person investigating such an environment, such power packs usually consisting of batteries, accumulators and the like which are heavy, expensive and require maintenance and replacement to prevent their relatively short life becoming even shorter. Further, when batteries are used, there is always the danger of acid leakage which can be harmful to the person carrying such batteries.

SUMMARY OF THE INVENTION

In order to overcome the above-mentioned defects, the present invention has for its main purpose and object to provide a turbine type of electrical generator that is operated by a pressure differential force emanating from a bottled gas source used by the person desiring the power in an underwater or smoke environment. It is an ancilliary object and purpose of the invention to provide, therefore, a low weight, low cost electrical power generating device which is easy to service and safe in handling. In accordance with the principles of the invention, there is provided a preferably high speed rpm turbine apparatus that operates on air bearings so as to reduce friction loss and avoid oil in the breathing system for the user of the device.

The invention will be better understood as well as further objects and advantages thereof become more apparent from the ensuing detailed description taken in conjection with the drawings.

DETAILED DESCRIPTION

Figure 1:
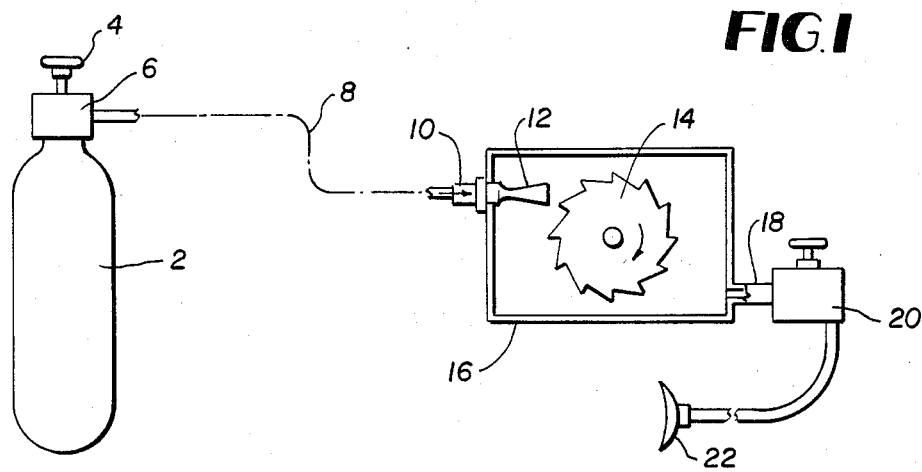
FIG. 1 is a schematic illustration of the invention.

Referring now to FIG. 1, there is shown a pressurized gas container 2 filled with air which is portable and carried by a scuba diver or a person entering a smoke environment, whichever the case may be. A valve 6 and handle 4 therefor allows the pressure (usually 210 bars) to flow via a conduit 8 to an inlet 10 of the generator housing 16, the volume of which is large enough so as to serve as a pneumatic accumulator to thereby direct a more steady mass flow towards the turbine rotor 14. The inlet 10 is designed to form a calibrated Laval venturi in the interior of the housing 16 directly adjacent the rotor 14. An outlet 18 carries the air pressure to a suitable pressure reducing device 20 for converting the air pressure to an adequate breathing pressure. A breathing mouthpiece 22 is connected to the pressure reduction device 20.

Figure 2:
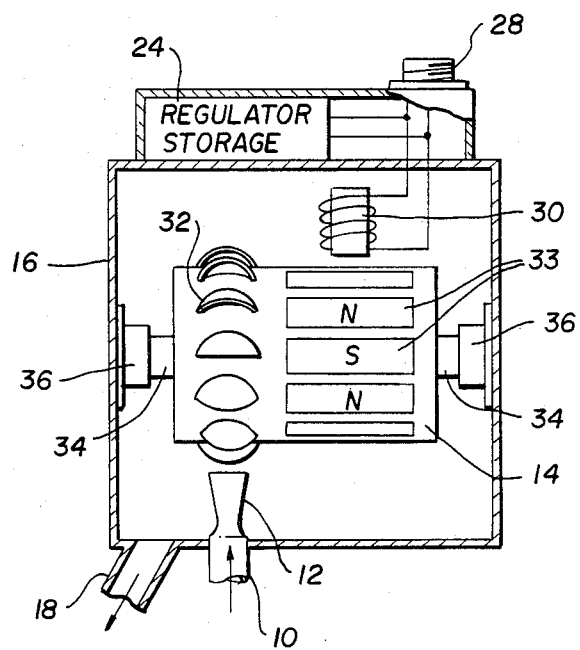
FIG. 2 is a detailed close-up plan view of the turbine device used by the invention.

In FIG. 2 a close-up of the turbine assembly is shown in which the rotor assembly is slightly modified from that shown in FIG. 1. Here the inlet 10 and the outlet 18 are on the same side of the housing 16. An electronic control compartment 24 is positioned adjacent the housing 16 for housing a regulator of known design for limiting the alternating current output of the coil device 30. Also, magnetic saturation circuits may be included for storing electrical energy in order to compensate for lapses in the output of the coil 30 caused by the periodicity of breathing. A connecting plug 28 of waterproof design is affixed to the control box for removably connecting the output of the coil to a consumer device, such as a lighting means, or perhaps even a propelling means for the scuba diver, if the invention is used in that context. The rotor structure 14 comprises a generally cylindrical rotor member of known design, having alternating bar magnets 33 arranged circumferentially and extending axially thereof, as shown, such that the magnets are in the vicinity of the coil 30 so as to inductively influence the coil. At the other end of the rotor is a circumferentially arranged array of air pocket vane members 32 which cause the rotor to rotate by means of the air pressure emanating from the venturi device 12. The rotor 14 has axial lugs 34 supported on air bearings 36 of known design.

Figure 3:
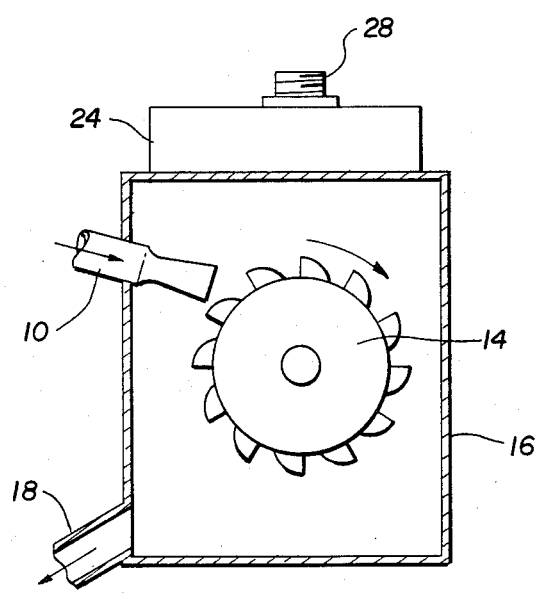
FIG. 3 is an elevational view of FIG. 2.

In FIG. 3, the housing 16 is seen to have the inlet conduit 10 located at the top thereof, while the outlet conduit is seen to emanate from the bottom of the housing 16.

The operation of the device as described above is as follows: for a 10 liter pressurized bottle or container under a starting pressure of about 210 bars, the required pressure drop to the desired breathing pressure in combination with the mass flow corresponds to a theoretical value of about 170 watt hours. It has been found, however, that 40 watt hours of electrical energy is about enough for practical purposes, that is, to power a lighting device and the like. When the pressure from the source container 6 is turned on, there is in effect an intermittant flow of air pressure through the housing 16 in response to the breathing cycle of the user of the invention breathing through the mouthpiece 22. The turbine generator should be designed to operate at a high speed of about 100,000 rpms, which high speed allows the rotational energy of the rotor partially covering that period corresponding to the user's exhalation when no intake air is being used to be stored by the magnetic saturation circuits in the compartment 24. Such an air-driven turbine is very cheap and easily producible or can be readily obtained in the marketplace; for example, an air-driven Pelton type of turbine may be used, such as used in gyro-compasses.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A power generator apparatus including a pressurized gas source container having sufficient quantities of oxygen for breathing purposes, comprising
    means for connecting said pressurized gas source to said power generator for transmission via a pressure drop in said gas source a gas pressure therethrough, said generator using at least a part of the flow rate of said gas pressure as a pneumatic energy input; and means connecting said generator to a mouthpiece means, whereby said gas pressure is available for breathing.

2. An apparatus according to claim 1, wherein said generator comprises a turbine for generating electricity.

3. An apparatus according to claim 2, wherein said turbine includes a rotor for operating at high speeds in response to said flow rate pneumatic energy input, whereby said rotor accumulates kenetic rotary energy.

4. An apparatus according to claim 2, wherein said generator includes a regulator means for limiting the electrical output of said generator.

5. An apparatus according to claim 2, wherein said generator includes a magnetic saturation circuit means for stabilizing the electric power output of said generator in response to a periodic input of said flow rate pneumatic energy input.

6. An apparatus according to claim 1, wherein said generator includes means for stabilizing said pneumatic energy input.

* * * * *